United States Patent
Aikawa et al.

(10) Patent No.: US 7,233,615 B1
(45) Date of Patent: Jun. 19, 2007

(54) TIMING CORRECTING DEVICE AND TIMING CORRECTING METHOD

(75) Inventors: Hideto Aikawa, Tokyo (JP); Kabushiki Kaisha, Tokyo (JP); Akihiro Shibuya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 561 days.

(21) Appl. No.: 10/069,516

(22) PCT Filed: Jul. 3, 2000

(86) PCT No.: PCT/JP00/04408

§ 371 (c)(1),
(2), (4) Date: Mar. 4, 2002

(87) PCT Pub. No.: WO02/003562

PCT Pub. Date: Oct. 1, 2002

(51) Int. Cl.
H04B 1/707 (2006.01)
H04L 7/00 (2006.01)

(52) U.S. Cl. .................. 375/147; 375/354; 370/342

(58) Field of Classification Search ............... 375/206, 375/200, 347, 349, 267, 150, 147, 142, 148, 375/145, 326, 149, 227, 140, 354; 370/335, 370/342, 515, 441, 343; 343/703, 725; 455/134, 455/500, 504, 506, 63, 65
See application file for complete search history.

(56) References Cited

U.S. PATENT DOCUMENTS

| | | | |
|---|---|---|---|
| 5,691,974 A | 11/1997 | Zehavi et al. | |
| 5,995,537 A * | 11/1999 | Kondo | 375/145 |
| 6,047,019 A * | 4/2000 | Ishii | 375/148 |
| 6,222,834 B1 * | 4/2001 | Kondo | 370/342 |
| 6,229,842 B1 * | 5/2001 | Schulist et al. | 375/148 |
| 6,333,934 B1 * | 12/2001 | Miura | 370/441 |
| 6,345,078 B1 * | 2/2002 | Basso | 375/349 |
| 6,590,888 B1 * | 7/2003 | Ohshima | 370/342 |
| 6,754,256 B1 * | 6/2004 | Kubo et al. | 375/150 |
| 6,763,056 B1 * | 7/2004 | Ohsuge | 375/140 |
| 6,768,729 B1 * | 7/2004 | Ohsuge | 370/342 |
| 6,795,422 B2 * | 9/2004 | Ohsuge | 370/342 |
| 6,873,648 B1 * | 3/2005 | Atarius et al. | 375/147 |
| 2001/0050950 A1 * | 12/2001 | Sato | 375/150 |
| 2002/0003791 A1 * | 1/2002 | Hayata | 370/342 |
| 2002/0176487 A1 * | 11/2002 | Fukada | 375/147 |

FOREIGN PATENT DOCUMENTS

| | | |
|---|---|---|
| EP | 0 673 130 | 9/1995 |
| EP | 704987 | 4/1996 |
| EP | 877493 | 11/1998 |
| EP | 942539 | 9/1999 |
| JP | 11-261410 | 9/1999 |

* cited by examiner

Primary Examiner—Temesghen Ghebretinsae
(74) Attorney, Agent, or Firm—Oblon, Spivak, McClelland, Maier & Neustadt, P.C.

(57) ABSTRACT

In the timing correcting device, a RAKE path detecting circuit 1 detects a plurality of path candidates to be tracked, from a reception signal, and outputs a "timing of a path" and a "detection correlation value" corresponding to each path candidate, as a result of the detection. Next, each tracking-path candidate deciding circuit ($2a$, $2b$, $2c$, . . . ) generates a predetermined decision standard that is necessary for selecting an optimum path timing from timings of the path candidates, based on an individually allocated result of the detection. Further, the tracking-path selecting circuit 3 selects a timing of an optimum path to be tracked, based on the result of the detection and the predetermined decision standards. Then, a comparator circuit 5 compares a predetermined reception reference timing given from the outside with the optimum path timing, and calculates a phase difference between the two. Last, the timing correction control circuit 6 controls a clock based on the phase difference, thereby to correct the reception reference timing.

18 Claims, 4 Drawing Sheets

TIMING CORRECTING DEVICE AND TIMING CORRECTING METHOD

TECHNICAL FIELD

This invention relates to a timing correcting device within a mobile station accommodated in a mobile communication system that employs a CDMA (Code Division Multiple Access) system. Particularly, the invention relates to a timing correcting device within a mobile station and a timing correcting method for executing a timing control necessary for establishing a synchronization of CDMA communication signals.

BACKGROUND ART

Conventional techniques will be explained below. For example, in a mobile station accommodated in a mobile communication system that employs a CDMA system, a reception timing of a receiving channel corresponding to a reception signal is detected by executing an inverse diffusion processing and a demodulation processing to pilot signals received in a predetermined period. Usually, in a mobile communication environment, reception signals are detected as a plurality of reception timing candidates in a RAKE path detector. In this case, paths detected as candidates have mutually different correlation values and reception timings.

At a mobile station, a main reception timing is determined from among the plurality of reception timing candidates. Specifically, at the mobile station, a reception reference timing held in advance is compared sequentially with the latest reception timing candidates. Then, the reception reference timing, that is, a clock to be managed inside, is corrected so that the reception reference timing coincides with an optimum reception timing that has been determined based on a result of the comparison.

In this way, at the mobile station, the optimum reception reference timing is obtained by absorbing a clock deviation between the mobile station and a base station, and a clock deviation due to a variation in a transmission distance, based on a clock correction.

As a concrete example of a timing correcting device for obtaining the optimum reception reference timing, there is a device disclosed in Japanese Patent Application Laid-open (JP-A) No. 11-261410, for example. FIG. 4 is a diagram showing a structure of a conventional timing correcting device described in the above publication. In FIG. 4, 101 denotes a reception timing detecting circuit, 102 denotes a comparator circuit, 103 denotes a reference timing generating circuit, 104 denotes a clock generating circuit, 105 denotes a timing correction control circuit, and 106 denotes a correction speed control circuit.

The operation of the timing correcting device will be explained. To begin with, the reception timing detecting circuit 101 generates a reception timing signal S(2) based on a pilot signal S(1) included in a reception signal, and outputs this to the comparator circuit 102.

On the other hand, the reference timing generating circuit 103 generates a reference timing signal S(4) of a period that is substantially the same as the period of the reception timing signal S(2), based on a clock signal S(3) received from the clock generating circuit 104, and outputs this to the comparator circuit 102.

The comparator circuit 102 compares the reception timing signal S(2) with the reference timing signal S(4), and outputs a result of this comparison to the timing correction control circuit 105 as a comparison result signal S(5).

When the comparator circuit 102 has detected a deviation between the reception timing signal S(2) and the reference timing signal S(4), the reference timing generating circuit 103 corrects the reference timing signal S(4) so that this coincides with the reception timing signal S(2).

However, in general, a reception wave in a radio communication is transmitted as a "multi-path" consisting of a direct wave that arrives directly and a plurality of reflection waves that arrive after reflecting from buildings or the like. An amount of delay in a reflection wave from a direct wave is not constant, and this amount of delay changes dynamically as it is controlled by the surrounding buildings and the topography. Further, at the mobile station, a reception timing of a reception wave changes every moment due to a change in the propagation route according to a move.

Thus, in the mobile communication environment, a direct wave is not always received, and sometimes the reception timing is detected from the reflection wave, and a reception reference timing is corrected by mistake in such a manner that it coincides with the reception timing of the reflection wave. Moreover, sometimes, at the next timing, a reception timing is detected from a direct wave, and a reception reference timing is corrected such that it coincides with the reception timing of the direct wave.

As explained above, according to the conventional clock correcting device described in the above-mentioned reference, there has been a problem that, when there is a large propagation path difference between a direct wave and a reflection wave, a reception reference timing is corrected frequently, and a switching of a received RAKE path occurs frequently, with a result that the load amount of correcting a reception reference timing increases. Further, according to the conventional clock correcting device, there has also been a problem that the frequency of updating a path allocation to a finger increases due to an erroneous tracking of a reception reference timing.

The present invention has been made in the light of the above problems. It is an object of this invention to provide a method of and a device for correcting a timing that is capable of determining a reception reference timing efficiently and in optimum, by realizing a reduction in the load amount of correcting a reception reference timing and a reduction in the frequency of updating a path allocation.

DISCLOSURE OF THE INVENTION

The timing correcting device relating to one aspect of the present invention comprises: a path detecting unit (corresponding to a RAKE path detecting circuit 1 in an embodiment to be described later) which detects a plurality of path candidates to be tracked from a reception signal, and outputting a "path timing" and a "detection correlation value" corresponding to each path candidate as a result; a plurality of decision reference generating units (corresponding to tracking-path candidate deciding circuits 2a, 2b, 2c, . . . ) that are individually allocated with a result of the detection, which generate a predetermined decision standard that is necessary for selecting an optimum path timing from among the timings of the path candidates, based on the allocated information; an optimum-path selecting unit (corresponding to a tracking-path selecting circuit 3) which selects an optimum path timing that should be tracked from among the timings of the path candidates, based on a result of the detection and the predetermined decision standard; a phase-difference calculating unit (corresponding to a comparator circuit 5) which compares a predetermined reception reference timing given from the outside with the optimum path timing, and calculating a phase difference between the two; and a timing correcting unit (corresponding to a timing correction control circuit 6, a clock generating circuit 7, and a reception reference counter 4) which corrects the reception reference timing by controlling a clock based on the phase difference.

According to the above-mentioned aspect of this invention, an optimum path around a reception reference timing is selected based on an output from each decision reference generating unit, and an internal clock is corrected based on a phase difference between the selected path and a predetermined reception reference timing. Thus, a center of a searcher and a finger window is always matched with the reception reference timing. With this arrangement, it is possible to efficiently carry out a multi-path detection around the reception reference timing, and it becomes possible to decrease the load amount of correcting the reception reference timing. Further, it is also possible to substantially decrease the frequency of updating a path allocation, as compared with the conventional technique of updating a path at timing other than around the reception reference timing too.

In the timing correcting device of this invention, the optimum-path selecting unit has a "path selection status", a "forward alignment status", and a "tracking-path holding status" as statuses, wherein, during the "path selection status", the timing correcting device selects the optimum path timing from among the path candidates based on the detection correlation value or the predetermined decision standard, and thereafter shifts the status from the "path selection status" to the "tracking-path holding status", during the "tracking-path holding status", the timing correcting device compares a result of a detection of a latest path with a timing of a current optimum path thereby to decide whether a path updating processing is to be carried out or not, and carries out the updating processing when a path that satisfies a predetermined updating condition exists as a result of the comparison, and shifts the status from the "tracking-path holding status" to the "forward alignment status" when paths do not exist within a range of an error of a predetermined number of samples prescribed in advance, and during the "forward alignment status", the timing correcting device holds a current optimum path timing when a path exists within a number of forward alignment stages even when paths do not exist within the range of an error of a predetermined number of samples prescribed in advance, and the timing correcting device shifts the status from the "forward alignment status" to the "path selection status" when no continuous paths exist over or above a number of forward alignment stages.

Thus, because of the provision of the optimum-path selecting unit, it is possible to shift immediately to the "tracking-path holding status" by selecting an optimum path timing from timings of the output paths of each decision reference generating unit, without making a shift to the backward alignment status, even when the status has been shifted to the "path selection status", for example. Therefore, it is possible to substantially improve the operation speed relating to a timing correction.

In the timing correcting device of this invention, during the "path selection status", the timing correcting device makes each of the decision reference generating unit have a priority as the predetermined decision standard, and selects a timing of a path allocated to the decision reference generating unit having a highest priority as an optimum path timing.

Thus, because of the provision of the optimum-path selecting unit which selects a timing of a path having a highest priority, it is possible to select a most stable path from among a plurality of path candidates.

In the timing correcting device of this invention, during the "path selection status", the timing correcting device utilizes the detection correlation value as one of the predetermined decision standards, and selects a timing of a path allocated to decision reference generating unit having a largest detection correlation value as an optimum path timing.

Thus, because of the provision of the optimum-path selecting unit which selects a timing of a path having a largest detection correlation value, it is possible to select a most stable path from among a plurality of path candidates.

In the timing correcting device of this invention, during the "path selection status", the timing correcting device makes each of the decision reference generating unit have stability information of a detection correlation value as the predetermined decision standard, and selects a timing of a path allocated to decision reference generating unit having correlation value stability information of a smallest variation in correlation values, as an optimum path timing.

Thus, because of the provision of the optimum-path selecting unit which selects a timing of a path having correlation value stability information of a smallest variation in correlation values, it is possible to select a most stable path from among a plurality of path candidates.

In the timing correcting device of this invention, when a path exists within a range of an error of a predetermined number of samples prescribed in advance as a result of a comparison in the "tracking-path holding status", this path satisfies the predetermined updating condition, and the timing correcting device updates the timing of this path as a next optimum path timing.

Thus, when a path exists within a range of an error of a predetermined number of samples prescribed in advance, this path satisfies the predetermined updating condition. Therefore, it is possible to provide a timing of a most stable path to the phase-difference calculating unit.

In the timing correcting device of this invention, when a plurality of paths exist within a range of an error of a predetermined number of samples prescribed in advance as a result of a comparison in the "tracking-path holding status", a path nearest to a current optimum path timing satisfies the predetermined updating condition, and the timing correcting device updates the timing of this path as a next optimum path timing.

Thus, when a plurality of paths exist within a range of an error of a predetermined number of samples prescribed in advance, a path nearest to a current optimum path timing satisfies the predetermined updating condition. Therefore, it is possible to provide a timing of a most stable path to the phase-difference calculating unit.

In the timing correcting device of this invention, when a plurality of paths exist within a range of an error of a predetermined number of samples prescribed in advance and further when two paths exist at both poles and at equal distance from a current optimum path timing as a result of a comparison in the "tracking-path holding status", a path having a higher detection correlation value satisfies the predetermined updating condition, and the timing correcting device updates the timing of this path as a next optimum path timing.

Thus, when a plurality of paths exist within a range of an error of a predetermined number of samples prescribed in advance and further when two paths exist at both poles and at equal distance from a current optimum path timing, a path having a higher detection correlation value satisfies the predetermined updating condition. Therefore, it is possible to provide a timing of a most stable path to the phase-difference calculating unit.

In the timing correcting device of this invention, when a plurality of paths exist within a range of an error of a predetermined number of samples prescribed in advance and further when two paths exist at both poles and at equal distance from a current optimum path timing as a result of a comparison in the "tracking-path holding status", a path having a tracking polarity direction that is the same as a past tracking direction satisfies the predetermined updating condition, and the timing correcting device updates the timing of this path as a next optimum path timing.

Thus, when a plurality of paths exist within a range of an error of a predetermined number of samples prescribed in advance and further when two paths exist at both poles and at equal distance from a current optimum path timing, a path having a tracking polarity direction that is the same as a past tracking direction satisfies the predetermined updating condition. Therefore, it is possible to provide a timing of a most stable path to the phase-difference calculating unit.

In the timing correcting device of this invention, the decision reference generating unit has a "path selection status", a "backward alignment status", a "forward alignment status", and a "tracking-path holding status" as statuses, wherein, during the "path selection status", the timing correcting device outputs a timing of an allocated path based on a result of the detection, and thereafter shifts the status from the "path selection status" to the "backward alignment status", during the "backward alignment status", the timing correcting device compares a result of a latest path detection with a timing of a current output path, and shifts the status from the "backward alignment status" to the "path selection status" when paths do not exist within a range of an error of a predetermined number of samples prescribed in advance, and when a path exists within a range of an error of a predetermined number of samples prescribed in advance and further when paths exist continuously over and above a number of backward alignment stages, the timing correcting device shifts the status from the "backward alignment status" to the "tracking-path holding status", during the "tracking-path holding status", the timing correcting device compares a result of a detection of a latest path with a timing of a current output path thereby to decide whether a path updating processing is to be carried out or not, and carries out the updating processing when a path exists that satisfies a predetermined updating condition as a result of the comparison, and the timing correcting device shifts the status from the "tracking-path holding status" to the "forward alignment status" when paths do not exist within a range of an error of a predetermined number of samples prescribed in advance, and during the "forward alignment status", the timing correcting device holds a current optimum path timing when a path exists within a number of forward alignment stages even when paths do not exist within the range of an error of a predetermined number of samples prescribed in advance, and the timing correcting device shifts the status from the "forward alignment status" to the "path selection status" when no continuous paths exist over or above a number of forward alignment stages.

Thus, because of the provision of the plurality of decision reference generating units capable of outputting a timing of an allocated path, it is possible to promptly select an optimum path even if the optimum-path selecting unit has overlooked a path. Therefore, it is possible to execute a secure clock correction.

In the timing correcting device of this invention, when a path exists within a range of an error of a predetermined number of samples prescribed in advance as a result of a comparison in the "tracking-path holding status", this path satisfies the predetermined updating condition, and the timing correcting device updates the timing of this path as a next output path timing.

Thus, when a path exists within a range of an error of a predetermined number of samples prescribed in advance, this path satisfies the predetermined updating condition. Therefore, it is possible to provide a timing of a most stable path to the optimum-path selecting unit.

In the timing correcting device of this invention, when a plurality of paths exist within a range of an error of a predetermined number of samples prescribed in advance as a result of a comparison in the "tracking-path holding status", a path nearest to a current output path timing satisfies the predetermined updating condition, and the timing correcting device updates the timing of this path as a next output path timing.

Thus, when a plurality of paths exist within a range of an error of a predetermined number of samples prescribed in advance, a path nearest to a current optimum path timing satisfies the predetermined updating condition. Therefore, it is possible to provide a timing of a most stable path to the optimum-path selecting unit.

In the timing correcting device of this invention, when a plurality of paths exist within a range of an error of a predetermined number of samples prescribed in advance and further when two paths exist at both poles and at equal distance from a current output path timing as a result of a comparison in the "tracking-path holding status", a path having a higher detection correlation value satisfies the predetermined updating condition, and the timing correcting device updates the timing of this path as a next output path timing.

Thus, when a plurality of paths exist within a range of an error of a predetermined number of samples prescribed in advance and further when two paths exist at both poles and at equal distance from a current optimum path timing, a path having a higher detection correlation value satisfies the predetermined updating condition. Therefore, it is possible to provide a timing of a most stable path to the optimum-path selecting unit.

In the timing correcting device of this invention, when a plurality of paths exist within a range of an error of a predetermined number of samples prescribed in advance and further when two paths exist at both poles and at equal distance from a current output path timing as a result of a comparison in the "tracking-path holding status", a path having a tracking polarity direction that is the same as a past tracking direction satisfies the predetermined updating condition, and the timing correcting device updates the timing of this path as a next output path timing.

Thus, when a plurality of paths exist within a range of an error of a predetermined number of samples prescribed in advance and further when two paths exist at both poles and at equal distance from a current optimum path timing, a path having a tracking polarity direction that is the same as a past tracking direction satisfies the predetermined updating condition. Therefore, it is possible to provide a timing of a most stable path to the optimum-path selecting unit.

The timing correcting device calculates the stability information held by each decision reference generating unit by using the detection correlation value, a moving average of variation widths of the detection correlation value, an average of total past variation widths, a moving sum of variation widths, a moving average of detection correlation values, and/or a combination of these values.

Thus, because of the provision of the plurality of decision reference generating units which calculates the stability information, the optimum-path selecting unit can select a most stable path from among a plurality of path candidates. With this arrangement, it is also possible to substantially decrease the frequency of updating a path due to an erroneous tracking of a multi-path. As a result, it is possible to prevent a wasteful clock correction that has occurred in the past.

The timing correcting method relating to another aspect of this invention comprises: a path detecting step of detecting a plurality of path candidates to be tracked from a reception signal, and outputting a "path timing" and a "detection correlation value" corresponding to each path candidate as a result; a decision reference generating step of individually allocating a result of the detection, and generating a predetermined decision standard that is necessary for selecting an optimum path timing from among the timings of the path candidates, based on the allocated information; an optimum-path selecting step of selecting an optimum path timing that should be tracked from among the timings of the path candidates, based on a result of the detection and the predetermined decision standard; a phase-difference calculating step of comparing a predetermined reception reference timing given from the outside with the optimum path timing, and calculating a phase difference between the two; and a timing correcting step of correcting the reception reference timing by controlling a clock based on the phase difference.

Thus, an optimum path around a reception reference timing is selected based on an output at the decision reference generating step, and an internal clock is corrected based on a phase difference between the selected path and a predetermined reception reference timing. Thus, a center of a searcher and a finger window is always matched with the reception reference timing. With this arrangement, it is possible to efficiently carry out a multi-path detection around the reception reference timing, and it becomes possible to decrease the load amount of correcting the reception reference timing. Further, it is also possible to substantially decrease the frequency of updating a path allocation, as compared with the conventional technique of updating a path at timing other than around the reception reference timing too.

In the timing correcting method of this invention, the optimum-path selecting step has a "path selection status", a "forward alignment status", and a "tracking-path holding status" as statuses, wherein, during the "path selection status", the optimum path timing is selected from among the path candidates based on the detection correlation value or the predetermined decision standard, and thereafter the status is shifted from the "path selection status" to the "tracking-path holding status", during the "tracking-path holding status", a result of a detection of a latest path is compared with a timing of a current optimum path thereby to decide whether a path updating processing is to be carried out or not, and the updating processing is carried out when a path exists that satisfies a predetermined updating condition as a result of the comparison, and the status is shifted from the "tracking-path holding status" to the "forward alignment status" when paths do not exist within a range of an error of a predetermined number of samples prescribed in advance, and during the "forward alignment status", a current optimum path timing is held when a path exists within a number of forward alignment stages even when paths do not exist within the range of an error of a predetermined number of samples prescribed in advance, and the status is shifted from the "forward alignment status" to the "path selection status" when no continuous paths exist over or above a number of forward alignment stages.

Thus, based on the inclusion of the optimum-path selecting step, it is possible to shift immediately to the "tracking-path holding status" by selecting an optimum path timing from timings of the output paths of each decision reference generating unit, without making a shift to the backward alignment status, even when the status has been shifted to the "path selection status", for example. Therefore, it is possible to substantially improve the operation speed relating to a timing correction.

In the timing correcting method of this invention, the decision reference generating step has a "path selection status", a "backward alignment status", a "forward alignment status", and a "tracking-path holding status" as statuses, wherein, during the "path selection status", a timing of an allocated path is output based on a result of the detection, and thereafter the status is shifted from the "path selection status" to the "backward alignment status", during the "backward alignment status", a result of a latest path detection is compared with a timing of a current output path, and the status is shifted from the "backward alignment status" to the "path selection status" when paths do not exist within a range of an error of a predetermined number of samples prescribed in advance, and when a path exists within a range of an error of a predetermined number of samples prescribed in advance and further when paths exist continuously over or above a number of backward alignment stages, the status is shifted from the "backward alignment status" to the "tracking-path holding status", during the "tracking-path holding status", a result of a detection of a latest path is compared with a timing of a current output path thereby to decide whether a path updating processing is to be carried out or not, and the updating processing is carried out when a path exists that satisfies a predetermined updating condition as a result of the comparison, and the status is shifted from the "tracking-path holding status" to the "forward alignment status" when paths do not exist within a range of an error of a predetermined number of samples prescribed in advance, and during the "forward alignment status", a current optimum path timing is held when a path exists within a number of forward alignment stages even when paths do not exist within the range of an error of a predetermined number of samples prescribed in advance, and the status is shifted from the "forward alignment status" to the "path selection status" when no continuous paths exist over or above a number of forward alignment stages.

Thus, because of the provision of the decision reference generating step of outputting a timing of an allocated path, it is possible to promptly select an optimum path even if a path has been overlooked at the optimum-path selecting step. Therefore, it is possible to execute a secure clock correction.

BEST MODE FOR CARRYING OUT THE INVENTION

The present invention will be explained in detail below with reference to the attached drawings.

Figure 1:
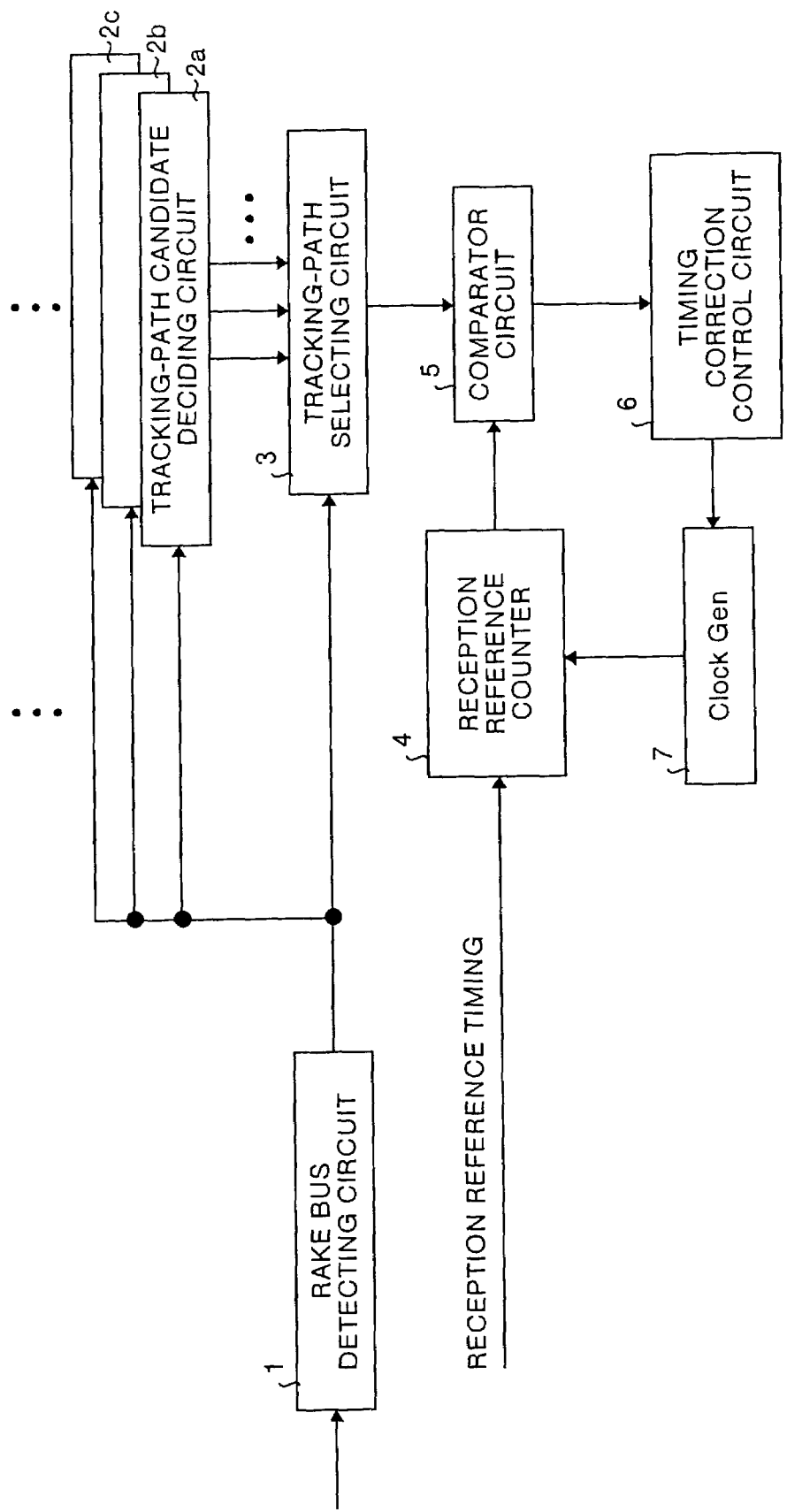
FIG. 1 is a diagram showing a structure of a timing correcting device relating to the present invention.

To begin with, a structure of a timing correcting device relating to the present invention will be explained. FIG. 1 is a diagram showing a structure of the timing correcting device relating to the present invention. In FIG. 1, 1 denotes a RAKE path detecting circuit, 2a, 2b, 2c, . . . denote tracking-path candidate deciding circuits, 3 denotes a tracking-path selecting circuit, 4 denotes a reception reference counter, 5 denotes a comparator circuit, 6 denotes a timing correction control circuit, and 7 denotes a clock generating circuit.

The operation of the timing correcting device relating to the present invention will be explained below. A reception base-band signal received by a mobile unit is input into the RAKE path detecting circuit 1. The RAKE path detecting circuit 1 detects a plurality of valid path candidates based on this reception signal. Thereafter, the RAKE path detecting circuit 1 outputs a "timing of each path" and a "detection correlation value" as a result of the RAKE path detection, to the tracking-path candidate deciding circuits 2a, 2b, 2c, . . . , and the tracking-path selecting circuit 3. The RAKE detection is carried out in an over-sampling period of n (an integer) times.

The above "timing of each path" and "detection correlation value" are allocated to each tracking-path candidate deciding circuit in a detection path unit. Each tracking-path candidate deciding circuit generates and outputs a predetermined decision standard that is necessary for the tracking-path selecting circuit 3 to select an optimum path. The tracking-path selecting circuit 3 selects an optimum path to be tracked from among the detected paths, based on the result of the RAKE path detection and the predetermined decision standards. The "path timing" that is output from each tracking-path candidate deciding circuit as one of the predetermined decision standards will hereinafter be called a second main path timing.

Specifically, in the initial status, the tracking-path selecting circuit 3 selects an optimum path based on a result of the RAKE path detection. In the status other than the initial status, the tracking-path selecting circuit 3 selects an optimum path from among paths corresponding to the second main path timing, based on the predetermined decision standard Thereafter, the tracking-path selecting circuit 3 outputs the selected "path timing" as the "path timing" to be tracked, to the comparator circuit 5. The "path timing" that is output from the tracking-path selecting circuit as the path timing to be tracked will hereinafter be called a first main path timing.

The comparator circuit 5 that has received the first main path timing compares a predetermined reception reference timing given from the outside and a reference counter value counted based on a clock signal from the clock generating circuit 7 with the first main path timing. Specifically, for example, an internal clock held by a mobile unit and an internal clock held by a base station do not operate completely in the same period, but have a constant clock deviation between them. This clock deviation may not be constant due to an influence of phasing or the like. There-fore, in order to receive accurately the information transmitted from the base station, it is necessary that this clock deviation is always corrected. For this purpose, the comparator circuit 5 checks whether there has been a deviation between the first main path timing and the reception reference timing set at the time of opening the reception channel, by carrying out the above comparison.

However, as the first main path timing expresses a timing of a common control channel and the reception reference timing expresses a reception reference timing, the comparator circuit 5 carries out a comparison after standardizing the timing based on one channel.

Thereafter, a phase difference between these timings detected by the comparator circuit 5 is output to the timing correction control circuit 6. The timing correction control circuit 6 outputs a correction quantity corresponding to this phase difference to the clock generating circuit 7 at every constant period (period frame). For example, when there is a phase difference of a predetermined value (for example, ¼ chip) or above between the reception reference timing and the first main path timing, the timing correction control circuit 6 generates a clock correction instruction to the clock generating circuit 7 at a rate of once per the above constant period frame. The clock generating circuit 7 corrects the counter value according to the posted correction quantity.

As explained above, according to the present embodiment, an optimum path around the reception reference timing is selected based on the output from each tracking-path candidate deciding circuit. The internal clock is corrected based on a phase difference between the selected path and the predetermined reception reference timing. Thus, a center of a searcher and a finger window is always matched with the reception reference timing. With this arrangement, it is possible to efficiently carry out a multi-path detection around the reception reference timing, and it becomes possible to decrease the load amount of correcting the reception reference timing. Further, it is also possible to substantially decrease the frequency of updating a path allocation, as compared with the conventional technique of updating a path at timing other than around the reception reference timing too.

Figure 2:
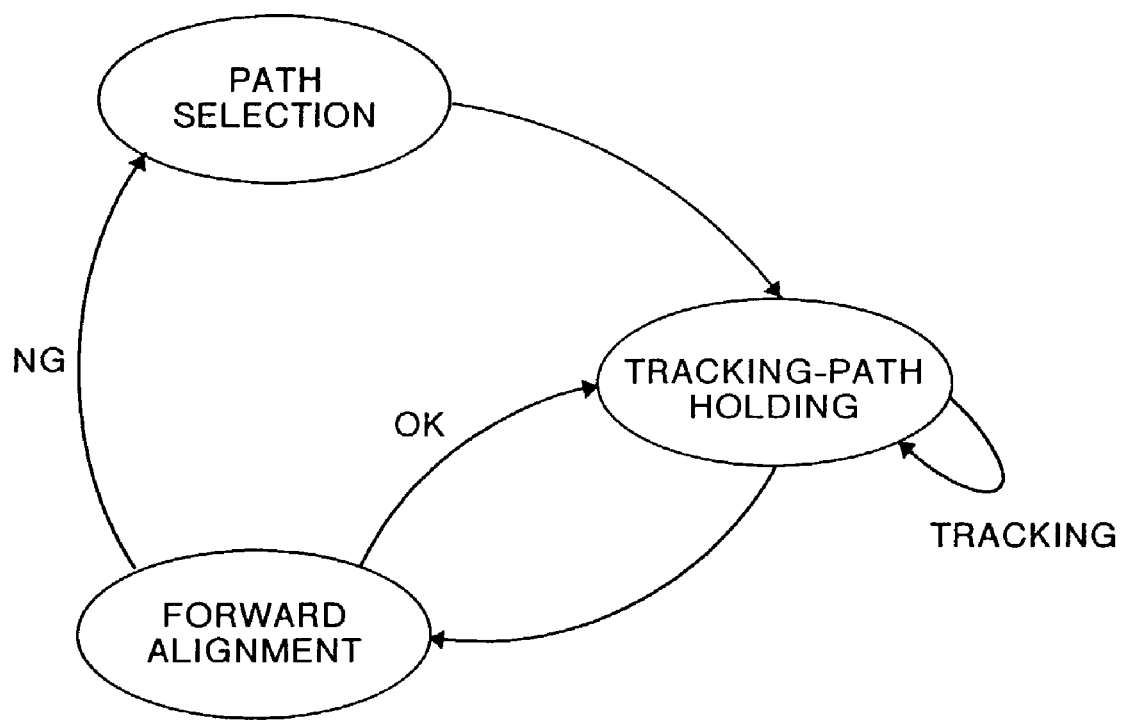
FIG. 2 is a diagram showing a shift of a status of a tracking-path selecting circuit.

The operation of the tracking-path selecting circuit 3 will now be explained in detail. FIG. 2 is a diagram showing a shift of a status of the tracking-path selecting circuit 3. The tracking-path selecting circuit 3 has a "path selection status", a "forward alignment status", and a "tracking-path holding status" as statuses, for example.

During the "path selection status" in the case of opening a channel, the tracking-path selecting circuit 3 selects a path having a largest detection correlation value as a path corresponding to the first main path timing from among the paths detected by the RKE path detecting circuit 1. On the other hand, during the "path selection status" in other cases, the tracking-path selecting circuit 3 selects a path corresponding to the first main path timing from among the paths allocated as a plurality of second main path timings. However, when there is no path that can be allocated as the second main path timing, the tracking-path selecting circuit 3 does not update the first main path timing. In the above operation, when a path corresponding to the first main path timing has been selected, the tracking-path selecting circuit 3 shifts the status from the "path selection status" to the "tracking-path holding status".

A method of selecting an optimum path corresponding to the first main path timing will be explained in detail below.

(1) As a first method, a priority is set to each tracking-path candidate deciding circuit in advance. Then, a path corresponding to a second main path timing that has been output from a tracking-path candidate deciding circuit having a highest priority is selected as a path that corresponds to the first main path timing. However, when the updating of the first main path timing has occurred by a specific number or more times during a constant period of time, the priority of a tracking-path candidate deciding circuit that has a second priority at present is increased by one.

(2) As a second method, from among a plurality of paths that have been allocated as second main path timings in the tracking status, a path having a largest detection correlation value is selected as a path that corresponds to the first main path timing.

(3) As a third method, from among a plurality of paths that have been allocated as second main path timings in the tracking status, a path having a smallest detection correlation value based on correlation stability information of each tracking-path candidate deciding circuit is selected as a path that corresponds to the first main path timing.

Next, during the "tracking-path holding status", each time when the RAKE path detecting circuit 1 has updated the RAKE path, the tracking-path selecting circuit 3 compares a result of the RAKE path detection with a current first main path timing, and decides whether an update processing is to be carried out or not. This will be explained in more detail.

(1) For example, as a result of a comparison between a RAKE path and a current first main path timing, when the RAKE path exists within a range of an error of a predetermined number of samples prescribed in advance, the tracking-path candidate deciding circuit 3 sets a timing of this RAKE path as a next first main path timing.

(2) Further, as a result of a comparison between a RAKE path and a current first main path timing, when a plurality of paths exist within a range of an error of a predetermined number of samples prescribed in advance, the tracking-path candidate deciding circuit 3 sets a timing of a path nearest to the first main path timing as a next first main path timing.

(3) Further, as a result of a comparison between a RAKE path and a current first main path timing, when a plurality of paths exist within a range of an error of a predetermined number of samples prescribed in advance and further when two paths exist at both poles and at equal distance from the first main path timing, the tracking-path candidate deciding circuit 3 sets a timing of a path having a higher detection correlation value as a next first main path timing.

(4) Further, in the above case (3), it is also possible to set as a next first main path timing a timing of a path having a tracking polarity direction that is the same as a past tracking direction.

Further, as a result of a comparison between a RAKE path and a current first main path timing, when paths do not exist within a range of an error of a predetermined number of samples prescribed in advance, or when paths exist within a range of an error of a predetermined number of samples but the detection correlation value does not reach a constant threshold value, the tracking-path selecting circuit 3 in the "tracking-path holding status" shifts the status to the "forward alignment status".

Finally, as a result of a comparison between a RAKE path and a current first main path timing, when paths do not exist within a range of an error of a predetermined number of samples prescribed in advance but when paths exist within a number of the forward alignment states, the tracking-path selecting circuit 3 in the "forward alignment status" holds the current tracking path as a path that corresponds to the first main path timing. In other words, the tracking-path selecting circuit 3 does not update the path. On the other hand, when paths do not exist continuously over or above a number of the forward alignment stages, the tracking-path selecting circuit 3 shifts the status from the "forward alignment status" to the "path selection status".

As explained above, according to the present embodiment, because of the provision of the tracking-path selecting circuit 3, it is possible to shift immediately to the "tracking-path holding status" by selecting an optimum first main path timing from the second main path timings without making a shift to the backward alignment status, even when the status has been shifted to the "path selection status", for example. Therefore, it is possible to substantially improve the operation speed relating to a timing correction.

Figure 3:
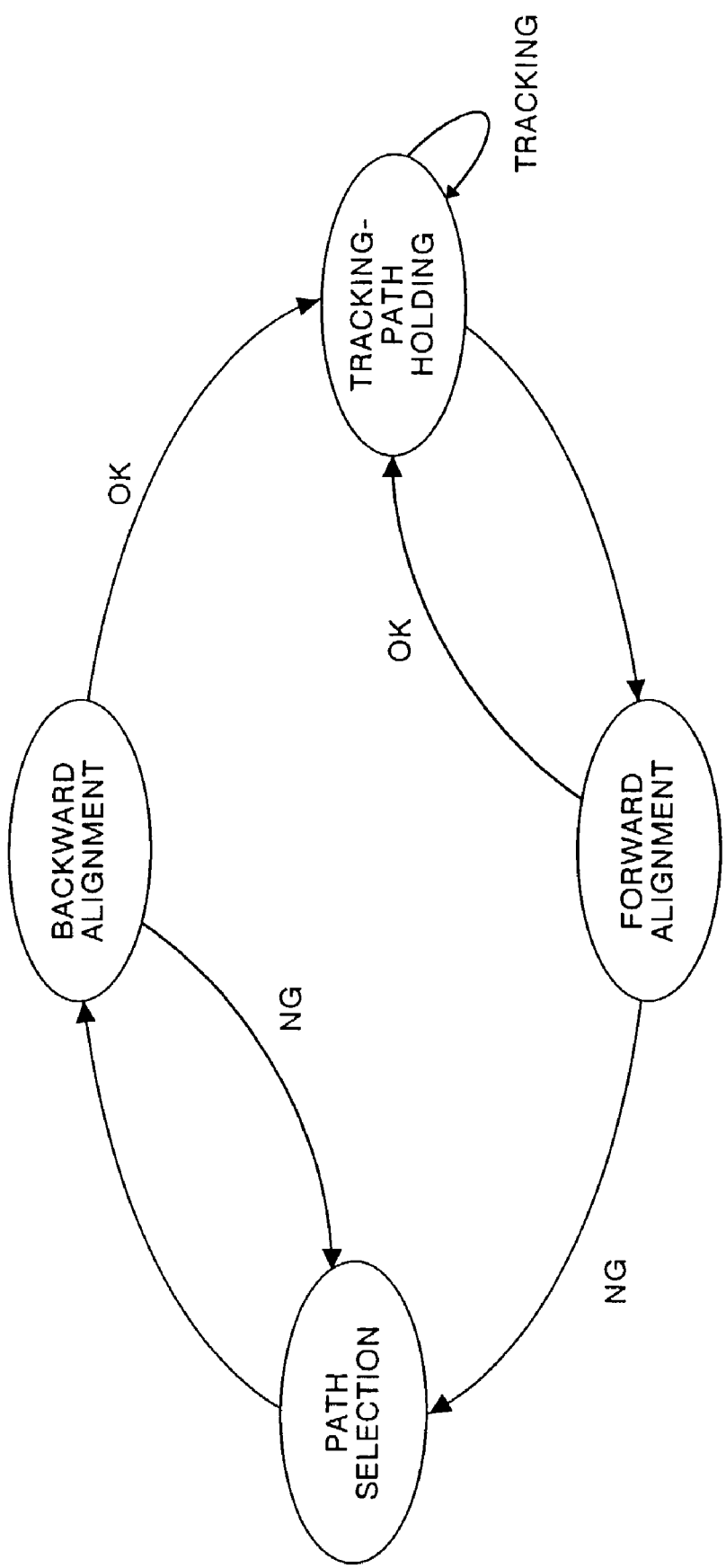
FIG. 3 is a diagram showing a shift of a status of each tracking-path candidate deciding circuit.
Figure 4:
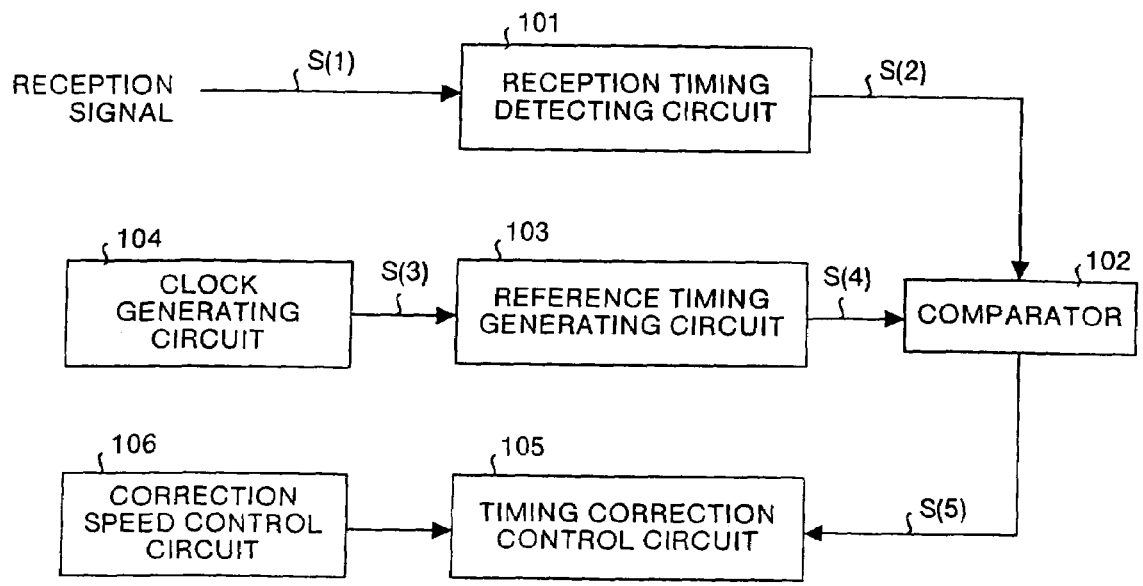
FIG. 4 is a diagram showing a structure of a conventional timing correcting device.

The operation of the tracking-path candidate deciding circuits 2a, 2b, 2c, . . . will now be explained in detail. FIG. 3 is a diagram showing a shift of a status of each tracking-path candidate deciding circuit. Each tracking-path candidate deciding circuit has, for example, a "path selection status", a "backward alignment status", a "forward alignment status", and a "tracking-path holding status" as statuses, and carries out a tracking operation to each different path.

During the "path selection status", m (where m is any desired integer) tracking-path candidate deciding circuits are allocated with m paths in the order of a large detection correlation value from among all paths that have been detected by the RAKE path detecting circuit 1. The m tracking-path candidate deciding circuits receive "path timings" and "detection correlation values" corresponding to respective paths. Then, each tracking-path candidate deciding circuit outputs a second main path timing corresponding to the allocated path, and shifts to the "backward alignment status".

During the "backward alignment status", each tracking-path candidate deciding circuit compares a result of the RAKE path detection with a current second main path timing. When paths do not exist within a range of an error of a predetermined number of samples prescribed in advance, the tracking-path candidate deciding circuit shifts the status from the "backward alignment status" to the "path selection status". On the other hand, when paths exist within a range of an error of a predetermined number of samples prescribed in advance and further when paths exist continuously over and above a number of backward alignment stages, the tracking-path candidate deciding circuit shifts the status from the "backward alignment status" to the "tracking-path holding status".

During the "backward alignment status", each time when the RAKE path has been updated by the RAKE path detecting circuit 1, each tracking-path candidate deciding circuit compares a result of the RAKE path detection with a current second main path timing, and decides whether the update processing is to be carried out or not. This will be explained in more detail.

(1) For example, as a result of a comparison between a RAKE path and a current second main path timing, when the RAKE path exists within a range of an error of a predetermined number of samples prescribed in advance, the tracking-path candidate deciding circuit 3 sets a timing of this RAKE path as a next first main path timing.

(2) Further, as a result of a comparison between a RAKE path and a current second main path timing, when a plurality of paths exist within a range of an error of a predetermined number of samples prescribed in advance, the tracking-path candidate deciding circuit 3 sets a timing of a path nearest to the second main path timing as a next second main path timing.

(3) Further, as a result of a comparison between a RAKE path and a current second main path timing, when a plurality of paths exist within a range of an error of a predetermined number of samples prescribed in advance and further when two paths exist at both poles and at equal distance from the second main path timing, the tracking-path candidate deciding circuit 3 sets a timing of a path having a higher detection correlation value as a next second main path timing.

(4) Further, in the above case (3), it is also possible to set as a next second main path timing a timing of a path having a tracking polarity direction that is the same as a past tracking direction.

Further, during the "tracking-path holding status", each tracking-path candidate deciding circuit holds stability information of a detection correlation value. The stability of a detection correlation value is calculated by using a variation width of the detection correlation value. For example, when S(x) represents a variation width of a detection correlation value and L(x) represents a detection correlation value during a time x, the variation width S(x) can be expressed as shown in the expression (1).

$$S(x)=|L(x)-L(x-1)| \quad (1)$$

When x=0, then S(x−1)=0. The stability of a detection correlation value is calculated form a variation width of the detection correlation value. It is also possible to calculate the stability based on a moving average of variation widths of the detection correlation value, an average of total past variation widths, a moving sum of variation widths, a moving average of detection correlation values, and/or a combination of these values.

As a result of a comparison with a current second main path timing, when a path does not exist within a range of an error of a predetermined number of samples prescribed in advance, the tracking-path candidate deciding circuit in the "tracking-path holding status" shifts the status to the "forward alignment status".

Finally, during the "forward alignment status", as a result of a comparison with a current second main path timing, when a path exists within a number of forward alignment stages even when paths do not exist within a range of an error of a predetermined number of samples prescribed in advance, each tracking-path candidate deciding circuit holds a current tracking path as a second main path timing. In other words, the tracking-path candidate deciding circuit does not update the path. On the other hand, when paths do not exist continuously over or above a number of the forward alignment stages, the tracking-path candidate deciding circuit shifts the status from the "forward alignment status" to the "path selection status".

As explained above, according to the present embodiment, because of the provision of a plurality of tracking-path candidate deciding circuits capable of outputting the second main path timing, it is possible to promptly select an optimum path even if the tracking-path selecting circuit 3 has overlooked a path. Therefore, it is possible to execute a more secure clock correction.

Further, according to the present embodiment, because of the provision of a plurality of tracking-path candidate deciding circuits capable of holding the stability information of the detection correlation value, the tracking-path candidate deciding circuit 3 select a most stable path from among a plurality of path candidates. With this arrangement, it is possible to substantially decrease the frequency of updating a path due to an erroneous tracking of a multi-path. As a result, it is possible to prevent a wasteful clock correction that has occurred in the past.

INDUSTRIAL APPLICABILITY

As explained above, the timing correcting device and the timing correcting method relating to the present invention are useful for a mobile communication system that employs the CDMA system. Particularly, the timing correcting device and the timing correcting method are suitable for a mobile station accommodated in the mobile communication system, that is, a demodulator of a portable telephone that requires a synchronous control within the mobile communication system.

The invention claimed is:

1. A timing correcting device, comprising:
   a path detecting unit configured to detect a plurality of path candidates to be tracked from a reception signal, and outputting a path timing, a detection correlation value, and stability information generated from multiple detection correlation values corresponding to each path candidate as a result;
   a plurality of decision reference generating units that are individually allocated with the result of the path detecting unit, configured to generate a predetermined decision standard that is necessary for selecting an optimum path timing from among the timings of the path candidates, based on the allocated information;
   an optimum-path selecting unit configured to select an optimum path timing that should be tracked from among the timings of the path candidates, based on the result of the path detecting unit and the predetermined decision standard, wherein the plurality of path candidates are selected within a search window that is matched with the reference timing;
   a phase-difference calculating unit configured to compare a predetermined reception reference timing given from the outside with the optimum path timing, and calculates a phase difference between the two timings; and
   a timing correcting unit configured to correct the reception reference timing by controlling a clock based on the phase difference.

2. The timing correcting device according to claim 1, wherein
   the optimum-path selecting unit includes a path selection status, a forward alignment status, and a tracking-path holding status,
   during the path selection status, the timing correcting device selects the optimum path timing from among the path candidates based on the detection correlation value or the predetermined decision standard, and thereafter shifts a status from the path selection status to the tracking-path holding status,
   during the tracking-path holding status, the timing correcting device compares a result of a detection of a latest path with a timing of a current optimum path thereby to decide whether a path updating processing is to be carried out or not, and carries out the updating processing when a path that satisfies a predetermined updating condition exists as a result of the comparison, and shifts the status from the tracking-path holding status to the forward alignment status when paths do not exist within a range of an error of a predetermined number of samples prescribed in advance, and
   during the forward alignment status, the timing correcting device holds a current optimum path timing when a path exists within a number of forward alignment stages even when paths do not exist within the range of an error of a predetermined number of samples prescribed in advance, and the timing correcting device shifts the status from the forward alignment status to the path selection status when no continuous paths exist over or above a number of forward alignment stages.

3. The timing correcting device according to claim 2, wherein during the path selection status, the timing correcting device makes each decision reference generating unit have a priority as the predetermined decision standard, and selects a timing of a path allocated to the decision reference generating unit having a highest priority as an optimum path timing.

4. The timing correcting device according to claim 2, wherein during the path selection status, the timing correcting device utilizes the detection correlation value as one of the predetermined decision standards, and selects a timing of a path allocated to the decision reference generating unit having a largest detection correlation value as an optimum path timing.

5. The timing correcting device according to claim 2, wherein during the path selection status, the timing correcting device makes each of the decision reference generating unit have the stability information as the predetermined decision standard, and selects a timing of a path allocated to the decision reference generating unit having the stability information of a smallest variation in correlation values, as an optimum path timing.

6. The timing correcting device according to claim 2, wherein when a path exists within a range of an error of a predetermined number of samples prescribed in advance as a result of a comparison in the tracking-path holding status, this path satisfies the predetermined updating condition, and the timing correcting device updates the timing of this path as a next optimum path timing.

7. The timing correcting device according to claim 2, wherein when a plurality of paths exist within a range of an error of a predetermined number of samples prescribed in advance as a result of a comparison in the tracking-path holding status, a path nearest to a current optimum path timing satisfies the predetermined updating condition, and the timing correcting device updates the timing of this path as a next optimum path timing.

8. The timing correcting device according to claim 2, wherein when a plurality of paths exist within a range of an error of a predetermined number of samples prescribed in advance and further when two paths exist at both poles and at equal distance from a current optimum path timing as a result of a comparison in the tracking-path holding status, a path having a higher detection correlation value satisfies the predetermined updating condition, and the timing correcting device updates the timing of this path as a next optimum path timing.

9. The timing correcting device according to claim 2, wherein when a plurality of paths exist within a range of an error of a predetermined number of samples prescribed in advance and further when two paths exist at both poles and at equal distance from a current optimum path timing as a result of a comparison in the tracking-path holding status, a path having a tracking polarity direction that is the same as a past tracking direction satisfies the predetermined updating condition, and the timing correcting device updates the timing of this path as a next optimum path timing.

10. The timing correcting device according to claim 2, wherein each decision reference generating unit includes a path selection status, a backward alignment status, a forward alignment status, and a tracking-path holding status, during the path selection status, the timing correcting device outputs a timing of an allocated path based on a result of the detection, and thereafter shifts the status from the path selection status to the backward alignment status, during the backward alignment status, the timing correcting device compares a result of a latest path detection with a timing of a current output path, and shifts the status from the backward alignment status to the path selection status when paths do not exist within a range of an error of a predetermined number of samples prescribed in advance, and when a path exists within a range of an error of a predetermined number of samples prescribed in advance and further when paths exist continuously over and above a number of backward alignment stages, the timing correcting device shifts the status from the backward alignment status to the tracking-path holding status, during the tracking-path holding status, the timing correcting device compares a result of a detection of a latest path with a timing of a current output path thereby to decide whether a path updating processing is to be carried out or not, and carries out the updating processing when a path exists that satisfies a predetermined updating condition as a result of the comparison, and the timing correcting device shifts the status from the tracking-path holding status to the forward alignment status when paths do not exist within a range of an error of a predetermined number of samples prescribed in advance, and during the forward alignment status, the timing correcting device holds a current optimum path timing when a path exists within a number of forward alignment stages even when paths do not exist within the range of an error of a predetermined number of samples prescribed in advance, and the timing correcting device shifts the status from the forward alignment status to the path selection status when no continuous paths exist over or above a number of forward alignment stages.

11. The timing correcting device according to claim 10, wherein when a path exists within a range of an error of a predetermined number of samples prescribed in advance as a result of a comparison in the tracking-path holding status, this path satisfies the predetermined updating condition, and the timing correcting device updates the timing of this path as a next output path timing.

12. The timing correcting device according to claim 10, wherein when a plurality of paths exist within a range of an error of a predetermined number of samples prescribed in advance as a result of a comparison in the tracking-path holding status, a path nearest to a current output path timing satisfies the predetermined updating condition, and the timing correcting device updates the timing of this path as a next output path timing.

13. The timing correcting device according to claim 10, wherein when a plurality of paths exist within a range of an error of a predetermined number of samples prescribed in advance and further when two paths exist at both poles and at equal distance from a current output path timing as a result of a comparison in the tracking-path holding status, a path having a higher detection correlation value satisfies the predetermined updating condition, and the timing correcting device updates the timing of this path as a next output path timing.

14. The timing correcting device according to claim 10, wherein when a plurality of paths exist within a range of an error of a predetermined number of samples prescribed in advance and further when two paths exist at both poles and at equal distance from a current output path timing as a result of a comparison in the tracking-path holding status, a path having a tracking polarity direction that is the same as a past tracking direction satisfies the predetermined updating condition, and the timing correcting device updates the timing of this path as a next output path timing.

15. The timing correcting device according to claim 5, wherein the timing correcting device in configured to calculate the stability information held by each decision reference generating unit by using the detection correlation value, a moving average of variation widths of the detection correlation value, an average of total past variation widths, a moving sum of variation widths, a moving average of detection correlation values, and/or a combination of these values.

16. A timing correcting method, comprising:

detecting a plurality of path candidates to be tracked from a reception signal, and outputting a path timing, a detection correlation value, and stability information generated from multiple detection correlation values corresponding to each path candidate as a result;

generating a decision reference by individually allocating the result of the detecting, and generating a predetermined decision standard that is necessary for selecting an optimum path timing from among the timings of the path candidates, based on the allocated information;

selecting an optimum path timing that should be tracked from among the timings of the path candidates, based on the result of the detecting and the predetermined decision standard, wherein the plurality of path candidates are selected within a search window that is matched with the reference timing;

calculating a phase-difference by comparing a predetermined reception reference timing given from the outside with the optimum path timing, and calculating a phase difference between the predetermined reception reference timing and the optimum path timing; and correcting the reception reference timing by controlling a clock based on the phase difference.

17. The timing correcting method according to claim 16, wherein selecting the optimum-path includes a path selection status, a forward alignment status, and a tracking-path holding status, during the path selection status, the optimum path timing is selected from among the path candidates based on the detection correlation value or the predetermined decision standard, and thereafter a status is shifted from the path selection status to the tracking-path holding status, during the tracking-path holding status, a result of a detection of a latest path is compared with a timing of a current optimum path thereby to decide whether a path updating processing is to be carried out or not, and the updating processing is carried out when a path exists that satisfies a predetermined updating condition as a result of the comparison, and the status is shifted from the tracking-path holding status to the forward alignment status when paths do not exist within a range of an error of a predetermined number of samples prescribed in advance, and during the forward alignment status, a current optimum path timing is held when a path exists within a number of forward alignment stages even when paths do not exist within the range of an error of a predetermined number of samples prescribed in advance, and the status is shifted from the forward alignment status to the path selection status when no continuous paths exist over or above a number of forward alignment stages.

18. The timing correcting method according to claim 17, wherein generating the decision reference includes a path selection status, a backward alignment status, a forward alignment status, and a tracking-path holding status, during the path selection status, a timing of an allocated path is output based on a result of the detection, and thereafter the status is shifted from the path selection status to the backward alignment status, during the backward alignment status, a result of a latest path detection is compared with a timing of a current output path, and the status is shifted from the backward alignment status to the path selection status when paths do not exist within a range of an error of a predetermined number of samples prescribed in advance, and when a path exists within a range of an error of a predetermined number of samples prescribed in advance and further when paths exist continuously over or above a number of backward alignment stages, the status is shifted from the backward alignment status to the tracking-path holding status, during the tracking-path holding status, a result of a detection of a latest path is compared with a timing of a current output path thereby to decide whether a path updating processing is to be carried out or not, and the updating processing is carried out when a path exists that satisfies a predetermined updating condition as a result of the comparison, and the status is shifted from the tracking-path holding status to the forward alignment status when paths do not exist within a range of an error of a predetermined number of samples prescribed in advance, and during the forward alignment status, a current optimum path timing is held when a path exists within a number of forward alignment stages even when paths do not exist within the range of an error of a predetermined number of samples prescribed in advance, and the status is shifted from the forward alignment status to the path selection status when no continuous paths exist over or above a number of forward alignment stages.

* * * * *